(12) United States Patent
Heintz et al.

(10) Patent No.: US 8,001,594 B2
(45) Date of Patent: Aug. 16, 2011

(54) MONITORING COMPUTER NETWORK SECURITY ENFORCEMENT

(75) Inventors: Robert Gordon Heintz, Manhattan Beach, CA (US); Jeffrey A. Christy, Aliso Viejo, CA (US)

(73) Assignee: iPass, Inc., Redwood Shores, CA (US)

( * ) Notice: Subject to any disclaimer, the term of this patent is extended or adjusted under 35 U.S.C. 154(b) by 1025 days.

(21) Appl. No.: 10/170,088

(22) Filed: Jun. 10, 2002

(65) Prior Publication Data

US 2003/0229808 A1 Dec. 11, 2003
US 2006/0010492 A9 Jan. 12, 2006

Related U.S. Application Data

(60) Provisional application No. 60/309,033, filed on Jul. 30, 2001.

(51) Int. Cl.
 *G06F 12/14* (2006.01)
(52) U.S. Cl. .......................... 726/22; 726/23
(58) Field of Classification Search ................ 726/22, 726/23
See application file for complete search history.

(56) References Cited

U.S. PATENT DOCUMENTS

| | | | |
|---|---|---|---|
| 4,130,874 A | 12/1978 | Pai | |
| 4,138,718 A | 2/1979 | Toke et al. | |
| 4,335,426 A | 6/1982 | Maxwell et al. | |
| 5,111,384 A * | 5/1992 | Aslanian et al. ............. | 714/26 |
| 5,146,568 A | 9/1992 | Flaherty et al. | |
| 5,165,017 A | 11/1992 | Eddington et al. | |

(Continued)

FOREIGN PATENT DOCUMENTS

EP 0881812 A2 2/1998

(Continued)

OTHER PUBLICATIONS

Gareiss, *Voice Over the Internet*, Data Communications, Sep. 1996, pp. 93-100.
Hansson, Nedjeral and Tonnby, *Phone Doubler—A Step Towards Integrated Internet and Telephone Communities*, Ericsson Review, No. 4, Jan. 1997, pp. 142-151.
Thom, *H.323: The Multimedia Communications Standard for Local Area Networks*, IEEE Communications Magazine, Dec. 1996, pp. 52-56.
Rigney, C. et al., "Remote Authentication Dial in User Service (Radius)," RFC2058, Jan. 1997 [online] [Retrieved from the Internet Jan. 12, 2005] URL<http:www.networksorcery.com/emp/rfc/rfc2058.txt>, pp. 1-60.

(Continued)

*Primary Examiner* — David J Pearson
(74) *Attorney, Agent, or Firm* — DeLizio Gilliam, PLLC

(57) ABSTRACT

Methods and systems are disclosed for monitoring activity of a user on a network component, such as an end user computer, in a virtual private network for adherence to a security enforcement provision or policy utilized in the virtual private network. A method of determining whether a security provision in a computer network has been violated is described. It is determined whether the network component has violated, modified or circumvented a security enforcement provision of the computer network. If the detection is affirmative, the network component, such as an end user system, is modified in a manner in which the computer network operates at a level appropriate to the degree of the violation, modification, or circumvention of the security enforcement provision. If instructed to do so, a third party operating the virtual private network is notified of the violation and access to the network by the network component is restricted or terminated. A security enforcement distributed system consists of an agent module on the end user computer and a collector module for receiving data from the agent on a security server computer coupled to a data repository. Also on the security serer are a policy inspector for checking compliance with a security provision and a notifier and access control module for informing the network operator of a violation and restricting access by the end user system to the security server.

18 Claims, 15 Drawing Sheets

U.S. PATENT DOCUMENTS

| | | | |
|---|---|---|---|
| 5,247,683 | A | 9/1993 | Holmes et al. |
| 5,291,543 | A | 3/1994 | Freese et al. |
| 5,321,840 | A | 6/1994 | Ahlin et al. |
| 5,421,009 | A | 5/1995 | Platt |
| 5,465,206 | A | 11/1995 | Hilt et al. |
| 5,483,445 | A | 1/1996 | Pickering |
| 5,491,791 | A * | 2/1996 | Glowny et al. ............... 714/37 |
| 5,517,549 | A | 5/1996 | Lee |
| 5,517,555 | A | 5/1996 | Amadon et al. |
| 5,596,643 | A | 1/1997 | Davis et al. |
| 5,596,723 | A | 1/1997 | Romohr |
| 5,603,038 | A * | 2/1997 | Crump et al. ............... 713/310 |
| 5,606,497 | A | 2/1997 | Cramer et al. |
| 5,615,351 | A | 3/1997 | Loeb |
| 5,633,919 | A | 5/1997 | Hogan et al. |
| 5,649,187 | A | 7/1997 | Hornbuckle |
| 5,659,601 | A | 8/1997 | Cheslog |
| 5,666,107 | A | 9/1997 | Lockhart et al. |
| 5,701,417 | A | 12/1997 | Lewis et al. |
| 5,727,002 | A | 3/1998 | Miller et al. |
| 5,732,127 | A | 3/1998 | Hayes |
| 5,768,521 | A | 6/1998 | Dedrick |
| 5,787,347 | A | 7/1998 | Yu et al. |
| 5,793,762 | A | 8/1998 | Penners et al. |
| 5,794,221 | A | 8/1998 | Egendorf |
| 5,797,097 | A | 8/1998 | Roach, Jr. et al. |
| 5,826,000 | A | 10/1998 | Hamilton |
| 5,838,907 | A | 11/1998 | Hansen |
| 5,842,011 | A | 11/1998 | Basu |
| 5,852,722 | A | 12/1998 | Hamilton |
| 5,852,812 | A | 12/1998 | Reeder |
| 5,867,494 | A | 2/1999 | Krishnaswamy et al. |
| 5,867,495 | A | 2/1999 | Elliott et al. |
| 5,867,661 | A | 2/1999 | Bittinger et al. |
| 5,893,077 | A | 4/1999 | Griffin |
| 5,898,780 | A | 4/1999 | Liu et al. |
| 5,909,544 | A | 6/1999 | Anderson, II et al. |
| 5,920,821 | A | 7/1999 | Seazholtz et al. |
| 5,922,050 | A | 7/1999 | Madany |
| 5,970,126 | A | 10/1999 | Bowater et al. |
| 5,980,078 | A | 11/1999 | Krivoshein et al. |
| 6,006,090 | A | 12/1999 | Coleman et al. |
| 6,012,088 | A | 1/2000 | Li et al. |
| 6,014,659 | A | 1/2000 | Wilkinson, III et al. |
| 6,047,327 | A | 4/2000 | Tso et al. |
| 6,049,826 | A | 4/2000 | Beser |
| 6,069,890 | A | 5/2000 | White et al. |
| 6,073,172 | A | 6/2000 | Frailong et al. |
| 6,078,582 | A | 6/2000 | Curry et al. |
| 6,098,098 | A | 8/2000 | Sandahl et al. |
| 6,128,729 | A | 10/2000 | Kimball et al. |
| 6,137,805 | A | 10/2000 | Berstis |
| 6,141,684 | A | 10/2000 | McDonald et al. |
| 6,157,648 | A | 12/2000 | Voit et al. |
| 6,161,133 | A | 12/2000 | Kikinis |
| 6,178,468 | B1 | 1/2001 | Rudd et al. |
| 6,195,694 | B1 | 2/2001 | Chen et al. |
| 6,202,157 | B1 * | 3/2001 | Brownlie et al. ............... 726/1 |
| 6,212,558 | B1 | 4/2001 | Antur et al. |
| 6,229,804 | B1 | 5/2001 | Mortsolf et al. |
| 6,243,815 | B1 | 6/2001 | Antur et al. |
| 6,286,038 | B1 | 9/2001 | Reichmeyer et al. |
| 6,295,556 | B1 | 9/2001 | Falcon et al. |
| 6,301,012 | B1 | 10/2001 | White et al. |
| 6,301,612 | B1 | 10/2001 | Selitrennikoff et al. |
| 6,314,459 | B1 | 11/2001 | Freeman |
| 6,334,147 | B1 | 12/2001 | Cromer et al. |
| 6,345,294 | B1 | 2/2002 | O'Toole et al. |
| 6,370,141 | B1 | 4/2002 | Giordano, III et al. |
| 6,385,648 | B1 | 5/2002 | Philippou et al. |
| 6,408,334 | B1 | 6/2002 | Bassman et al. |
| 6,412,025 | B1 | 6/2002 | Cheston et al. |
| 6,426,955 | B1 | 7/2002 | Dalton, Jr. et al. |
| 6,434,611 | B1 | 8/2002 | Wilson et al. |
| 6,449,642 | B2 | 9/2002 | Bourke-Dunphy et al. |
| 6,530,024 | B1 * | 3/2003 | Proctor ............... 726/23 |
| 6,690,651 | B1 | 2/2004 | Lamarque, III et al. |
| 6,711,693 | B1 * | 3/2004 | Golden et al. ............... 713/400 |
| 6,735,701 | B1 * | 5/2004 | Jacobson ............... 726/1 |
| 6,854,010 | B1 * | 2/2005 | Christian et al. ............... 709/223 |
| 6,874,087 | B1 * | 3/2005 | Fetkovich et al. ............... 726/23 |
| 6,990,591 | B1 * | 1/2006 | Pearson ............... 726/22 |
| 7,213,068 | B1 * | 5/2007 | Kohli et al. ............... 709/225 |
| 2002/0002706 | A1 * | 1/2002 | Sprunk ............... 725/29 |
| 2002/0078382 | A1 * | 6/2002 | Sheikh et al. ............... 713/201 |
| 2002/0095591 | A1 * | 7/2002 | Daniell et al. ............... 713/200 |
| 2002/0099958 | A1 * | 7/2002 | Hrabik et al. ............... 713/201 |
| 2002/0112182 | A1 * | 8/2002 | Chang et al. ............... 713/201 |
| 2003/0014658 | A1 * | 1/2003 | Walker et al. ............... 713/200 |

FOREIGN PATENT DOCUMENTS

| | | |
|---|---|---|
| EP | 1065862 A2 | 3/2001 |
| WO | WO 97/27692 | 7/1997 |
| WO | WO 97/33412 | 9/1997 |
| WO | WO 98/05145 | 2/1998 |
| WO | WO 98/23079 | 5/1998 |
| WO | WO 98/37665 | 8/1998 |
| WO | WO 00/52916 | 9/2000 |

OTHER PUBLICATIONS

"International Equality," Network World, vol. 13, No. 21, May 20, 1996, p. 6.

"ISPs Target Remote Users," Network World, vol. 13, No. 17, Apr. 22, 1996, p. 16.

"More on PSA Acquisition of UK Internet Provider," Newsbytes News Network, Jun. 23, 1995.

IPass Inc., "About iPass," [online Jan. 1996][Retrieved on Feb. 23, 1999] Retrieved from the Internet<URL:http://www.ipass.com/about-ipass/history.shtml>, pp. 1-2, This page has either been removed or changed, no longer available at this site.

IPass Inc., "About iPass," [online Jan. 1996] [Retrieved on Jan. 27, 1997] Retrieved from the Internet<URL:http://www.ipass.com/about-ipass/management-team.shtml> pp. 1-2, This page has either been removed or changed, no longer available at this site.

IPass Inc., "Our Services," [online Jan. 1996] [Retrieved on Feb. 23, 1999] Retrieved from the Internet:<http://www.ipass.com/internet-roaming/white-paper.shtml#1> pp. 1-12, This page has either been removed or changed, no longer available at this site.

IPass Inc., "Our Services," [online Jan. 1996] [Retrieved on Feb. 23, 1999] Retrieved from the Internet:<http://www.ipass.com/internet-roaming/billing-usage.shtml> pp. 1-12, This page has either been removed or changed, no longer available at this site.

iPass Inc., "True Global Internet Roaming," [online] [Retrieved on Sep. 14, 1998] Retrieved from the Internet:<http://www.ipass.com>p. 1, This page has either been removed or changed, no longer available at this site.

iPass Services "Become a Global Provider Today," [online] [Retrieved on Oct. 28, 1998] Retrieved from the internet:URLhttp://www.ipass.com/services/isp.html pp. 1-3. This page has either been removed or changed, no longer available at this site.

IPass Inc., "Your Guide to Global Internet Roaming," Marketing Brochure, 1997, pp. 1-2.

Hayden, Michael, "GRIC Phone Architecture & Interfaces," AimQuest Corporation Internal Document, 1997, pp. 1-8.

"GRIC Phone Release Roadmap," AimQuest Corporation Internal Document, Dec. 3, 1997, pp. 1-11.

GRIC Communications, Inc., "Cisco Systems and GRIC Communications Team on Internet Telephony Settlement," Press Release, Feb. 17, 1998, pp. 1-2.

International Telecommunications Union, "Series H: Audiovisual and Multimedia Systems, Infrastructure of Audiovisual Services—Systems and Terminal Equipment for Audiovisual Services, Packet-Based Multimedia Communications Systems," ITU-T Recommendation H.323, Jul. 2003, pp. i-135.

* cited by examiner

MONITORING COMPUTER NETWORK SECURITY ENFORCEMENT

This application claims priority under 35 U.S.C. §119(e) to U.S. Provisional Patent Application No. 60/309,033 filed on Jul. 30, 2001, entitled "Method and Apparatus for Monitoring Computer Network Security Enforcement."

BACKGROUND OF THE INVENTION

1. Field of the Invention

The present invention relates generally to computer network security software. More specifically, it relates to distributed software and network components for monitoring user actions effecting measures taken for computer network security enforcement.

2. Discussion of Related Art

With the advent of the Internet and rapid growth of "telecommuting" and working while traveling, computer network and data security has become increasingly important. Consequences of violations of an entity's network security policies can be catastrophic. Huge amounts of data, including highly sensitive data, can be exposed to the public and especially individuals looking for loopholes in a company's network security.

It is common practice now for a company, entity or organization to have some type of network security enforcement if the company allows its employees to work from home, use laptops while traveling, working from satellite offices, or simply using a desktop computer on the company's premises. For example, a firewall program typically runs on a server that checks data coming in and out of a company's internal network. Typically, companies are concerned with external entities entering their private network and corrupting or exposing sensitive data. There are a large number of programs and tools a company can employ to secure its network.

A specific category or type of network is a virtual private network or VPN. A VPN is made up of computer workstations that are physically located outside a company's network. The most common example is a workstation located at an employee's home office. This workstation, for example a PC or Mac, may be the property of the employee and is being used for work and to access company resources in addition to normal home use. However, because it is being used for work and is using a public network, such as the Internet, to access company resources, the company requires that the computer execute network security enforcement software. It is crucial that this enforcement software, whether it is a single program or a bundle of programs, operate when expected and not be modified, adjusted, by-passed or shut down. In many cases the user may not be aware of the network security software installed on the computer by the company, for example with company laptops and desktop computers. As such, in some instances, a user may not be aware that he or she is violating a company security policy or somehow effecting the operation of a security program. Such inadvertent or unintentional violations can be as dangerous as intentional or malicious violations.

As mentioned, the number of security enforcement programs available for workstations on a VPN and other types of networks has grown considerably. As a result, monitoring whether security programs on a particular workstation are operating and actually enforcing security policies have become an important aspect of a company's network security scheme. Some workstations can have numerous separate programs for enforcing security and all need to be functioning when the computer is in use. A company needs to know whether any of the security enforcement programs have been shut off, modified or simply not functioning properly. However, there are no effective tools to allow a company to effectively manage and monitor its VPN or computer network security enforcement policy, typically implemented through specific network security software programs. In addition, other computer network security devices, such as by Info Express and Sygate, are not functional if not connected to a network or VPN Thus, they cannot ensure that security provisions are abided by when they are not connected to a VPN.

Therefore, what is needed is a method and system for allowing an entity to effectively monitor and manage its computer network security policy. In addition, such a method and system should alert the entity when a network security policy has been violated and take certain actions when violations occur.

SUMMARY OF THE PREFERRED EMBODIMENTS

To achieve the foregoing, methods and systems are disclosed for monitoring the activity of a user on a network component in a virtual private network for abidance by a security enforcement provision utilized in virtual private network. In one aspect of the present invention, a method of determining whether a security provision in a computer network has been violated is described. It is determined whether a network component has violated, modified or circumvented a security enforcement provision of the computer network. If the detection is affirmative, the network component, such as an end user system, operates at a level that is appropriate to the severity or level of the violation, modification, or circumvention as determined by the computer network operator.

In another aspect of the present invention, a method of monitoring abidance of a network component by a security enforcement provision utilized in a computer network includes detecting whether the network component has violated, modified or circumvented the security enforcement provision of the computer network. It is then determined whether an enforcement provision monitoring module has been violated, modified or circumvented. If either detection is affirmative, the network component is acted upon in a manner appropriate given the level or severity of the violation or modification as determined by a network operator. The method also includes comparing a profile record containing information on the network component to a rule set defining a security policy and notifying an operator of the computer network if either detection is affirmative.

In another aspect of the present invention, a system for monitoring abidance by a network security provision present in a network is described. The system includes an agent module residing on an end user system which collects data on the system and transmits it to a security server. The security server, under control of a security service provider, contains multiple components for receiving and inspecting data. Also under control of a security service provider is a security database containing end user system data and security rule data, wherein the security server and the security database are in direct communication. Also contained on the security server is a notification module capable of notifying a third party of a security violation. The notification can also include restricting access of the end user system to other components in the network.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of monitoring workstations in a network, for example, a virtual private network (VPN), for security violations is described in the various figures. An entity may have a computer network security policy for its workstations that includes security software programs A, B and C and company security rules X and Y. The entity can adequately safeguard its network, such as a VPN, if employees abide by this computer network security policy. Programs A, B and C must be operational and unmodified and the user must be aware of and abide by security rules X and Y for the security policy to be effective. The present invention allows the company to monitor whether the programs and rules, that is, the company's security policy is in effect. The invention monitors and can notify appropriate parties in the entity of any policy violation and take certain automatic actions, such as denying any further access if appropriate. In addition, the invention will notify the entity when the monitoring software itself is modified or shut down.

Figure 1:
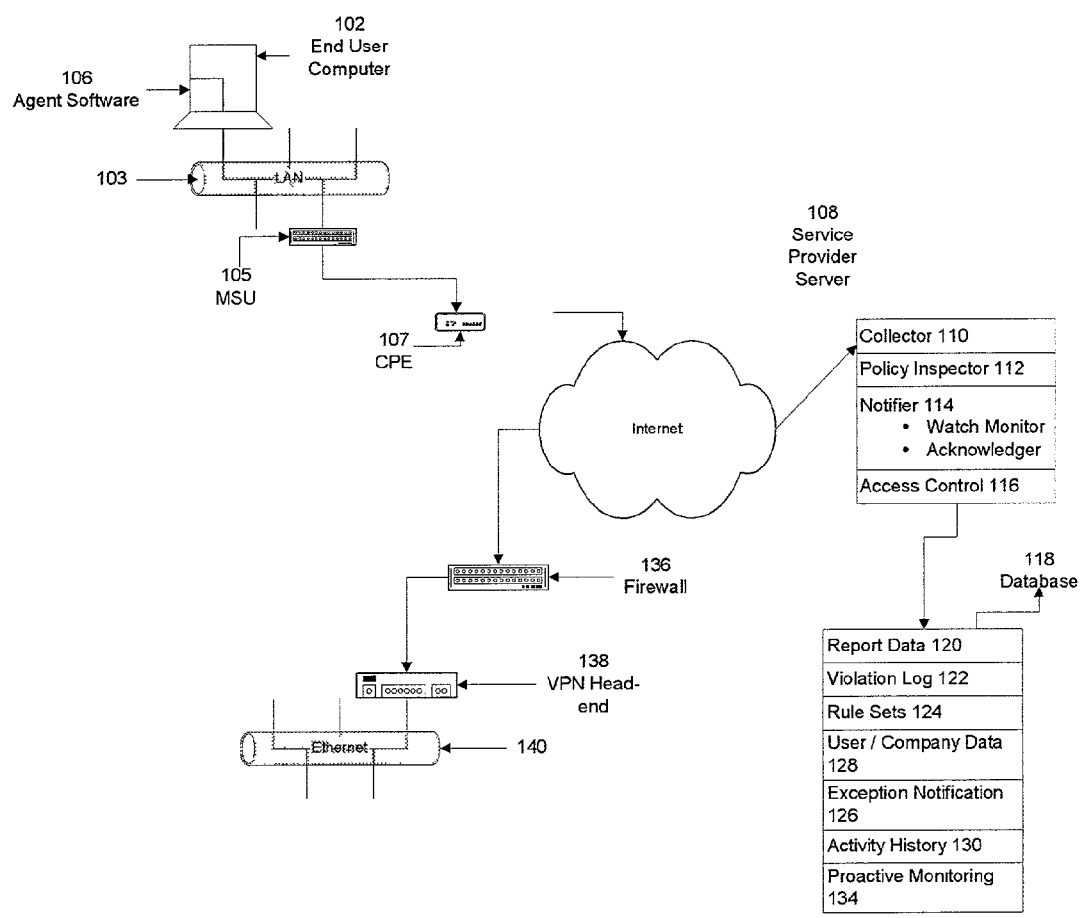
FIG. 1 is an illustration of the various network components and resources for monitoring a workstation in a network in accordance with one embodiment of the present invention.

FIG. 1 is an illustration of the various network components and resources for monitoring a workstation in a network in accordance with one embodiment of the present invention. A client or workstation 102 contains data belonging to an employer and is connected to the internet 104 through an end user LAN 103. A LAN is not necessary, for example if being used from a home office. Workstation 102 can be at an employee's house or be a laptop computer used by an employee while traveling. Agent software 106 resides on workstation 102, installed typically by the employee or employer. Agent 106 causes client 102 to send certain data, described below, to a server 108 under the control of a third-party service provider. Before that, data traffic goes through a managed service unit (MSU) 105 and some type of customer premise equipment (CPE) 107. With respect to MSU 105 or any other type of network perimeter security device or provision, such as a software firewall, the present invention ensures that such a device or provision is installed and operational. Proper installation and non-tampering are treated as rules that must be followed or that are considered to be part of a network security program. If the network perimeter security device or firewall is not installed and operational, this is indicated in a report, described below, and appropriate action is taken.

Server 108 has numerous components or modules, including, but not limited to: collector 110, policy inspector 112, notifier 114 and access control 116. Also under the control of the service provider is a data repository 118 holding various types of data including, but not limited to, agent data collection sets or report data 120, exception log 122, rule sets 124, exception notification groups 126, customer information 128 and activity history data 130. The third-party service provider provides security monitoring and management services to customers (e.g., an employer) having workstations on a public network or using a public network to implement a VPN. Notifier component 114 causes server 108 to send a notification to an employer having an interest in the security enforcement of workstation 102. A notification can be sent via email or other means to employer server 132 or premises. A proactive monitor 134 also resides on service provider server 108 and is able to detect when an agent does not send collected data at a scheduled time which is considered a security violation. In a preferred embodiment, there is also a connection to a customer corporate network which has a firewall 136, a VPN head-end 138 and a customer's network, such as an Ethernet network 140.

Figure 2A:
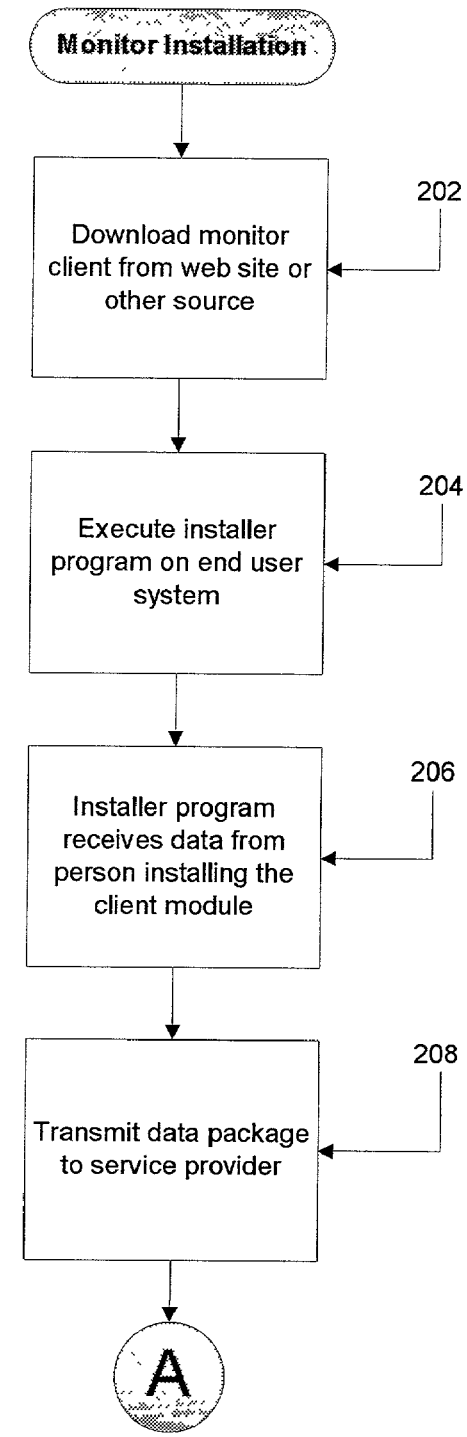
FIGS. 2A and 2B are flow diagrams of an installation process for the monitoring client module on an end-user system in accordance with one embodiment of the present invention.
Figure 2B:
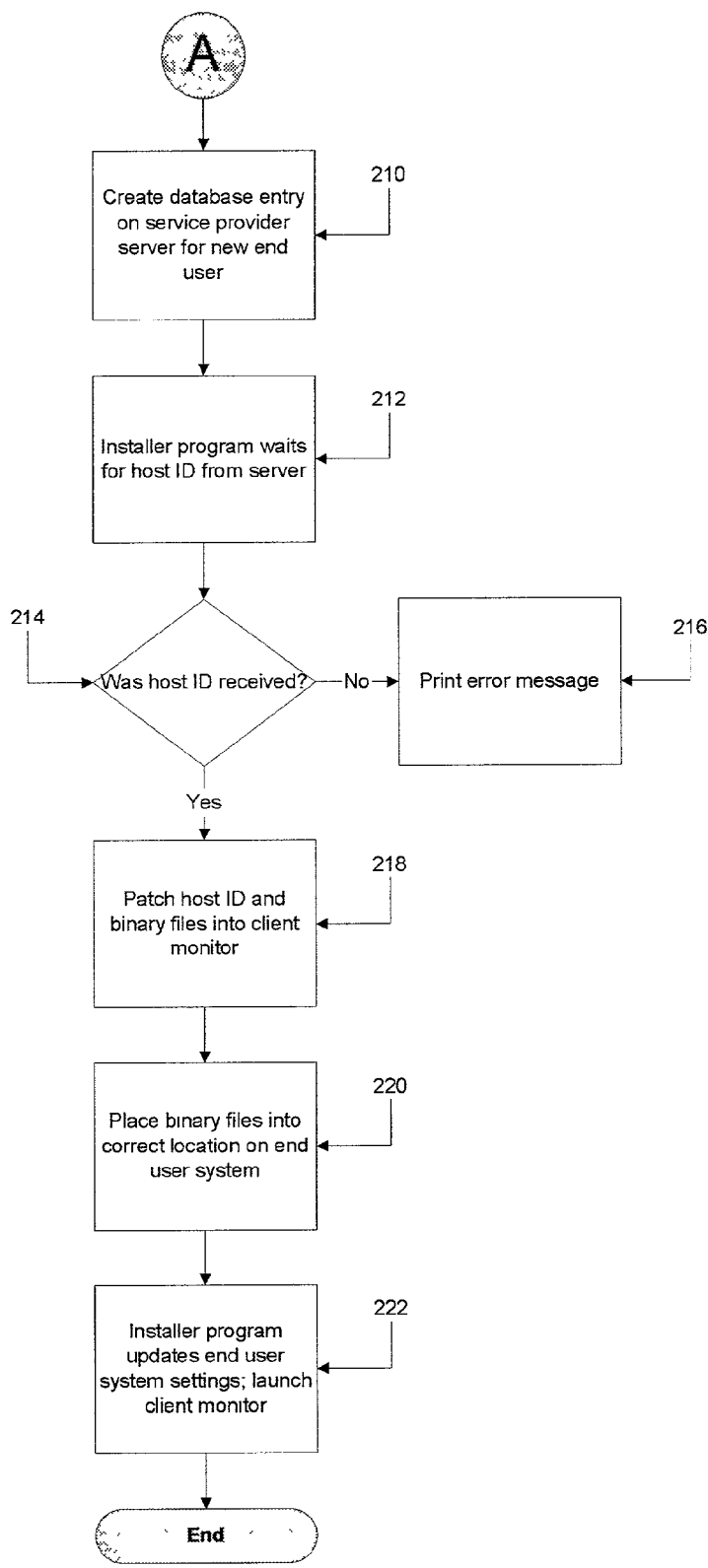

FIGS. 2A and 2B are flow diagrams of an installation process for a monitoring module on an end-user system in accordance with one embodiment of the present invention. At step 202 the client module is downloaded from a service provider website. The module can also be placed directly onto the end-user system from a CD-ROM or other source by the employer without the employee's knowledge. At step 204 an installer program in the client module is executed. Again, this can be executed by the employer or directly by the employee. At step 206 the install program receives data from the person installing the module such as company name, end-user name, and end-user order number. In a preferred embodiment, this information plus other information is sent as a package of data to service provider server 108 via the Internet at step 208. At step 210 of FIG. 2B the service provider server creates a database entry described in FIG. 3. At step 212 the installer program waits for a host ID from the server which uniquely identifies the end-user system. At step 214 the client checks whether a host ID was received. If one was not received, the installer prints an error on the client and the process is aborted at step 216.

If a host ID is received, at step 218 the installer program patches the host ID and the necessary binary files into the client and at step 220 places the files and binaries into the appropriate location in the end-user system. In a preferred embodiment, no data is stored on the end-user system outside the client module. The host ID and other data is rewritten into the client module. This enables the monitor module to be invoked when the end-user system boots up. Finally, at step 222 the installer program updates the system settings such as operating system registers and system boot up and the installer then launches the monitor module.

Figure 3A:
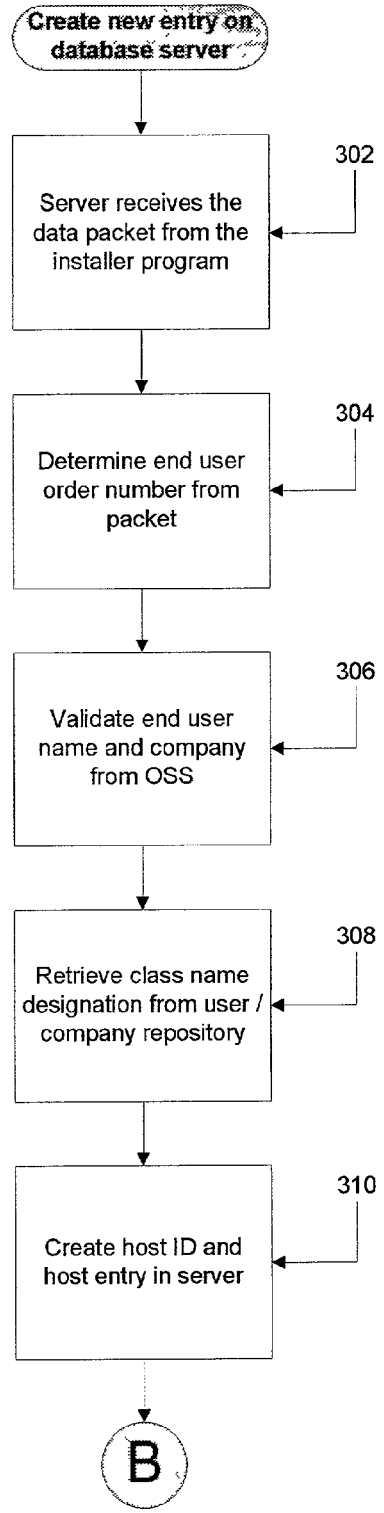
FIGS. 3A and 3B are flow diagrams of a process of creating an entry for a new end user on the server in accordance with one embodiment of the present invention.
Figure 3B:
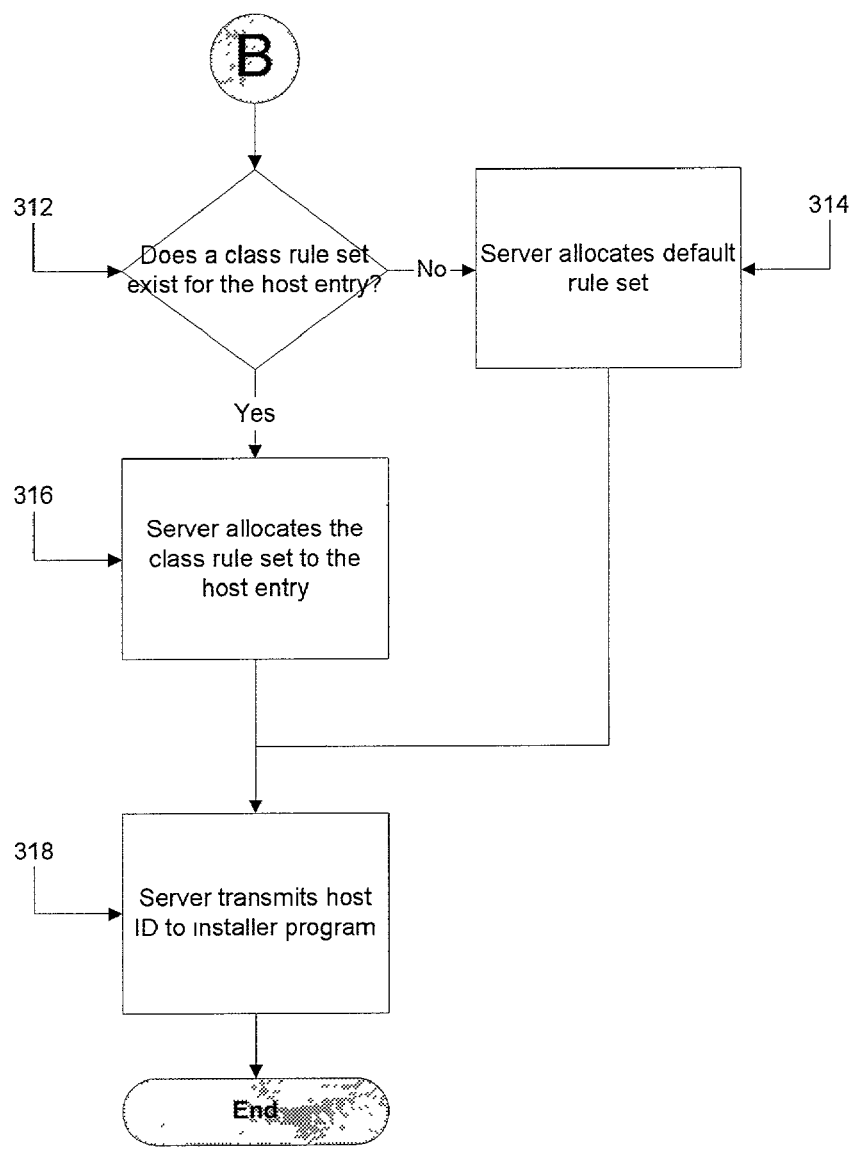

FIGS. 3A and 3B are flow diagrams of a process of creating an entry for a new end user on the server in accordance with one embodiment of the present invention. At step 302 the service provider server receives the data package or packet from the new installer program described above. The server obtains the end user order number from the packet at step 304. At step 306 the server validates the end-user, company, and email address obtained from a user data repository that maintains data on all end users and companies. In a preferred embodiment, this data is contained in an operational support system (OSS), a core system that tracks all new installations and customers. At step 308 the server determines whether the end user and company are valid. A class name designation for the end user is retrieved by the server from the user/company data repository 128 at step 308. The class name identifies one or more rule sets to be applied to the end user, described below. For example, an end user may be part of an Accounting Group or an Engineering Group which has its own set of rules. The end user class name identifies the rule sets. At step 310 the server generates a host ID. In a preferred embodiment the host ID is 32 bits long. The server also creates a host entry in the service provider database. At step 312 of FIG. 3B the server checks for a class rule set for the host entry. If one does not exist the server allocates a default rule set to the host entry at step 314. If one does exist, the server allocates the class rule set to the host entry at step 316 and at step 318 the server sends the host ID to the installer program. In a preferred embodiment, the workstation's IP address can be used to apply different rule sets depending on the IP address space allocated for that workstation.

Figure 4A:
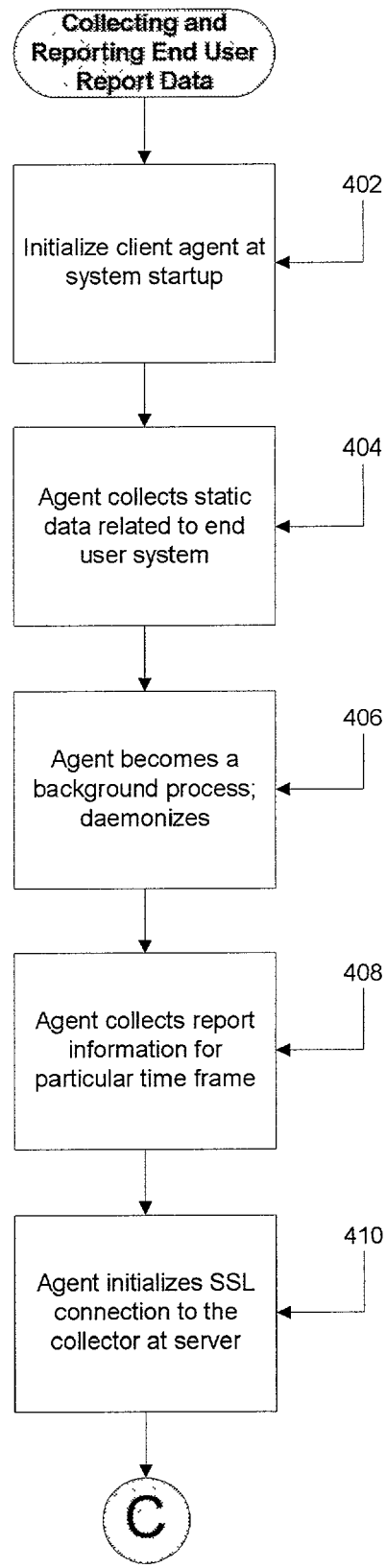
FIGS. 4A and 4B are flow diagrams of a process of collecting and reporting end user system information on the client module in accordance with one embodiment of the present invention.
Figure 4B:
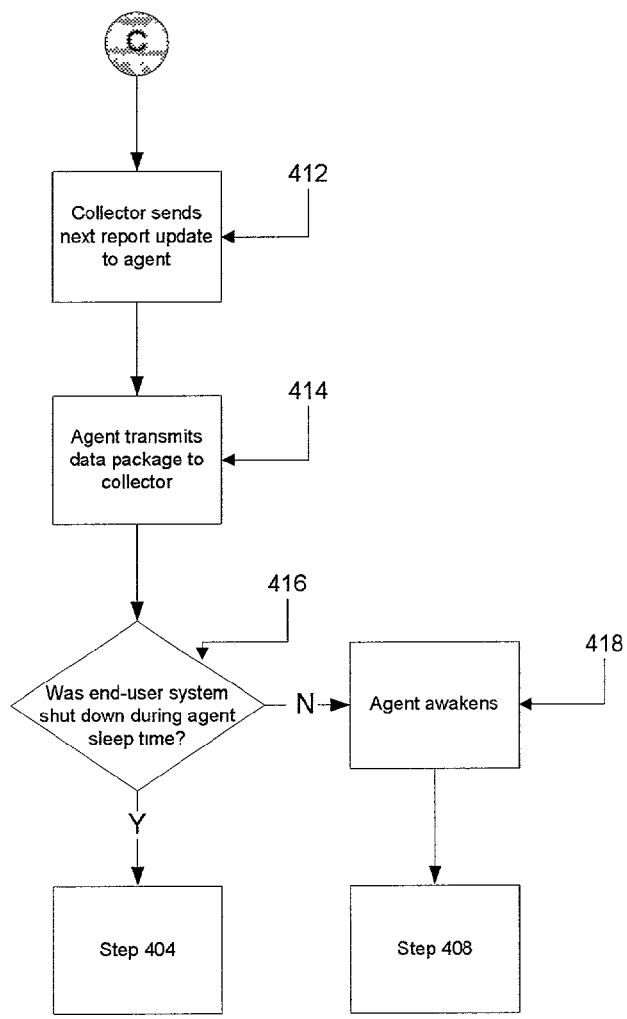

FIGS. 4A and 4B are flow diagrams of a process of collecting and reporting end user system information on the client module in accordance with one embodiment of the present invention. At step 402 the module or agent on the client is initialized by system start up. At step 404 the agent collects static data or data that only needs to be collected once after the computer is booted up, such as uptime. At step 406 the agent daemonizes or becomes a background process. At step 408 the agent collects report information that is particular to a period of time while the computer is running and can change from one time frame to the next. At step 410 the agent initializes a Secure Socket Layer (SSL) connection to the collector. The agent then receives the next update time for the next report from the collector at step 412 of FIG. 4B. In a preferred embodiment, this also acts as a confirmation that the previous report was received. At step 414 the agent sends the data package containing the static and report information to the collector. The server then determines whether the end-user system was shutdown during the agent sleep time (time between sending reports) at step 416. If the system was not shut down during the agent sleep the agent awakens at the designated time at step 418 and control returns to step 408 where the agent collects report information. If the system was shut down, at step 420 the agent collects static and other report information as described in step 404 and 408 above and sends the data to the server after opening an SSL connection.

Figure 5:
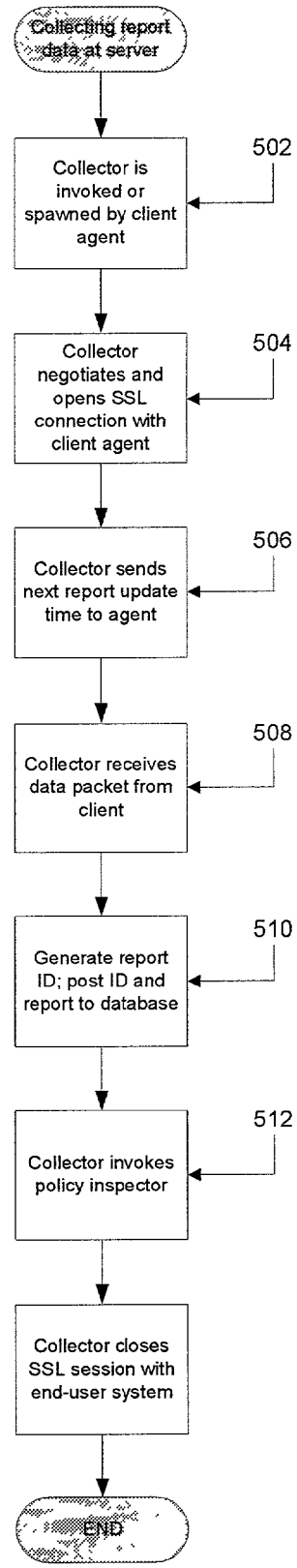
FIG. 5 is a flow diagram of a process of a collector module on the server receiving data from the client agent in accordance with one embodiment of the present invention.

FIG. 5 is a flow diagram of a process of a collector module on the server receiving data from the client agent in accordance with one embodiment of the present invention. It describes steps from FIGS. 4A and 4B, however, from the perspective of the security service provider, that is, from the server perspective. At step 502 a collector on the server is invoked or called by the agent or monitoring module on the client. At step 504 the collector negotiates an SSL connection with the agent. The collector then sends the next update time to the agent at step 506 and then receives the data packet from the agent at step 508. After validating the packet, the collector generates a unique report ID number for the data package and posts the report information and the report ID number to the database at step 510. At step 512 the collector invokes the policy inspector and transmits the report ID. At step 514 the collector closes the SSL session with the end user system.

Figure 6A:
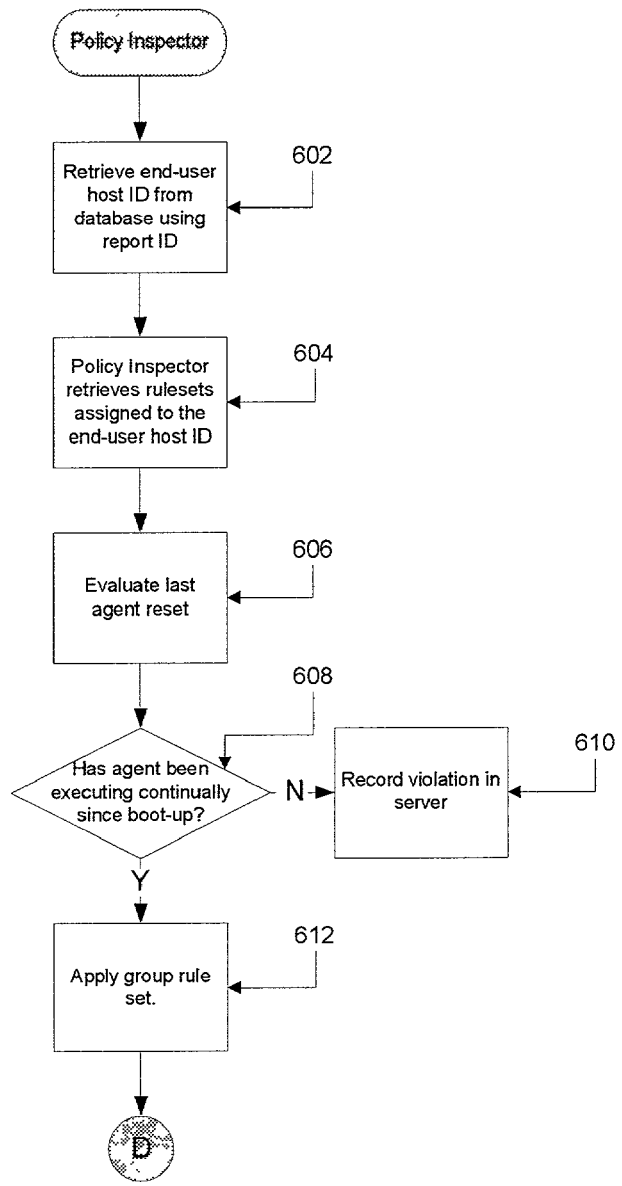
FIGS. 6A and 6B are flow diagrams of a process of the policy inspector determining rule set violations by the end-user system in accordance with one embodiment of the present invention.
Figure 6B:
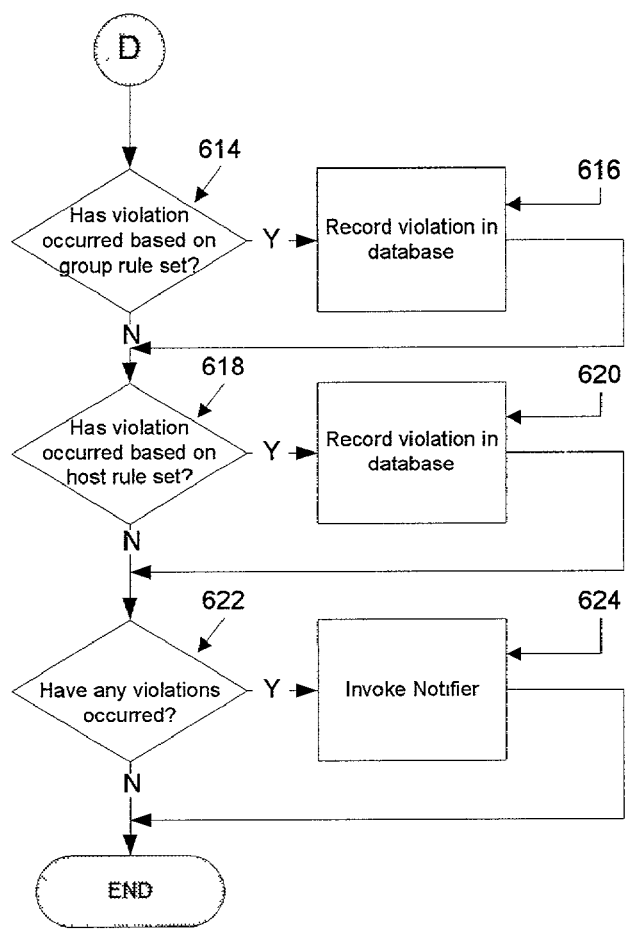

FIGS. 6A and 6B are flow diagrams of a process of the policy inspector determining rule set violations by the end user system in accordance with one embodiment of the present invention. After being invoked by the collector and receiving and validating a report ID, the policy inspector retrieves an end user host ID from the database using the report ID at step 602. At step 604 the policy inspector accesses one or more rule sets assigned to the end user host ID. At step 606 the policy inspector evaluates the last agent reset. The inspector determines the reason the agent module was last reset such as termination, reset by user or any other reason. The goal being to determine if anything unusual was done to reset the agent. At step 608 the inspector determines whether the agent has been continually running since the end user system was booted up. If the monitor module or agent has not been running continually since the client booted up, a security violation has occurred. Thus, at step 610, if the policy inspector has not been running continually the violation is recorded in the server. If the module has been running continually the policy inspector applies a group rule set at step 612. A group rule set applies to all end users in a particular group, such as a division in a company or an entire company.

It is then determined if a violation occurred based on the group rule set at step 614 of FIG. 6B. If there is a violation the policy inspector records the violation at step 616. Control then goes to step 618 where the policy inspector applies a host rule set which contains security rules that are more specific and may be "customized" to the particular end user. If a violation is detected at step 618 the policy inspector records the violation at step 620. Control then goes to step 622 where the policy inspector determines whether there were any violations based on either the group rule set or the host rule set. If there are none, the process is complete. If there are violations, the policy inspector logs the violations and invokes the notifier at step 624 and the process is complete.

Figure 7A:
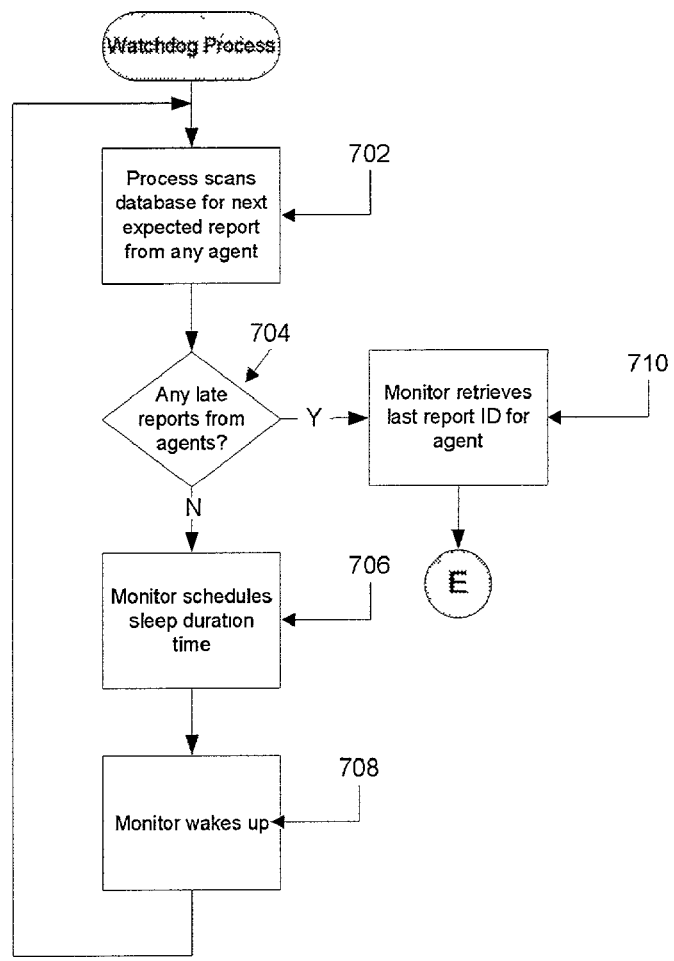
FIGS. 7A and 7B are flow diagrams of a "watch dog" process in the server that monitors the database for scheduled updates by agents in accordance with one embodiment of the present invention.
Figure 7B:
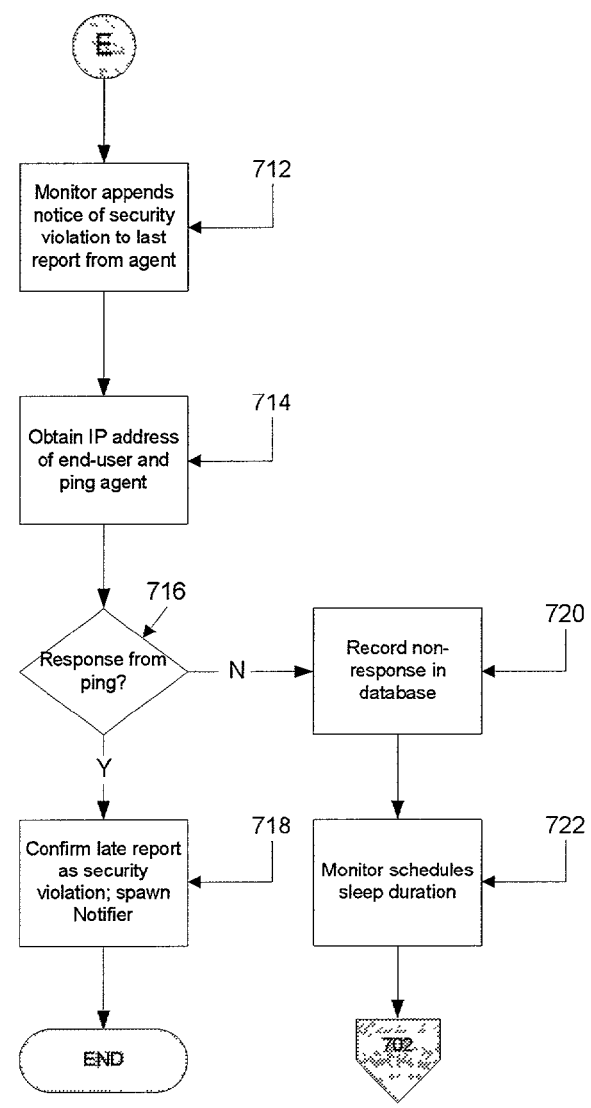

FIGS. 7A and 7B are flow diagrams of a "watch dogs" process in the server that monitors the database for scheduled updates by agents in accordance with one embodiment of the present invention. At step 702 a watch monitor scans the database for the next expected report from any of the agents currently running. At step 704 the watch monitor determines whether there are any late reports from any of the agents. If there are no late reports, the watch monitor schedules its own sleep duration as the amount of time before the next report is due from any of the agents plus an additional length of time, such as five seconds in a preferred embodiment at step 706. At step 708 the watch monitor wakes up at its scheduled time and returns to step 702.

If there is a late report from a particular agent, at step 710 the watch monitor retrieves the last report ID for that particular agent or end user. At step 712 the watch monitor appends the notice of the security violation, i.e., the late report, to the last report from that agent. At step 714 the IP address of the end user is obtained from the last report and is used to ping the end user for the agent, namely workstation 102. At step 716 the watch monitor determines whether the IP address responds to the ping. If it does, the client is still running and the late report is therefore confirmed as a late report from an active agent. This violation is then recorded by the watch monitor in the database at step 718 and the notifier is invoked or spawned. The watch monitor then schedules its sleep duration as described above and the scan process is repeated.

If the IP address does not respond to the ping, at step 720 the watch monitor records the non-response in the database. The watch monitor then logs the IP address in a ping monitoring system in the server which monitors the IP address continuously by performing pings. At step 722 the watch monitor schedules its sleep duration as described above and returns to the beginning of the scanning process when it wakes up.

Figure 8:
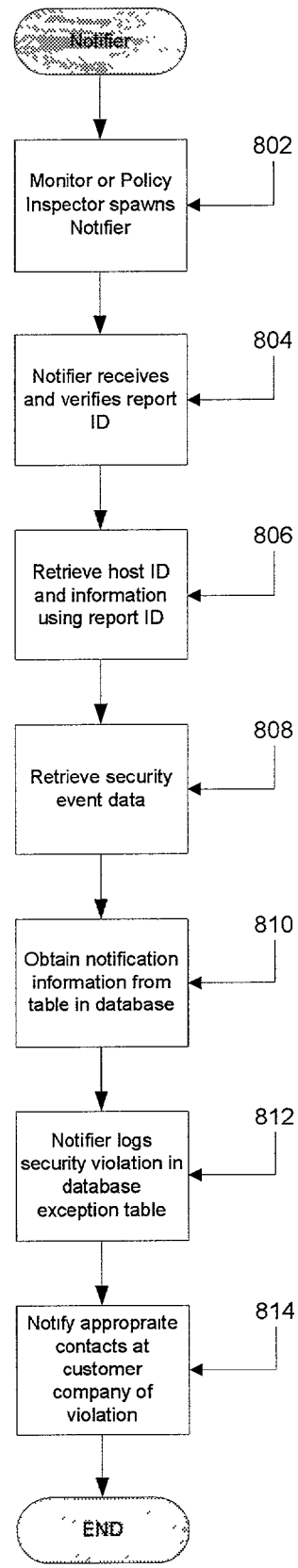
FIG. 8 is a flow diagram of a process of the notifier handling and transmitting violation notifications to customers in accordance with one embodiment of the present invention.

FIG. 8 is a flow diagram of a process of the notifier handling and transmitting violation notifications to customers in accordance with one embodiment of the present invention. At step 802 the notifier is spawned by the watch monitor or the policy inspector as described above. At step 804 the notifier receives and verifies the particular report ID given by the monitor or the inspector. From the report ID, the notifier retrieves the host ID and host information at step 806. At step 808 the notifier retrieves the security violation event information, such as severity of the violation, violation description, end user order number, time, company and IP address. At step 810 the notifier obtains customer notification information from a notification information table in the database. This table contains details on how to contact the appropriate people at the service provider and customer company when a security violation occurs. As will be described below, there can be different levels of notification. For example, if a first group of notification is made and not responded to, a second group of people to notify is contacted. This process is referred to as escalation. At step 812 the notifier logs the security violation event in a violation event table in the database. Finally, at step 814 the notifier causes the actual notification of the appropriate people at the customer company of the violation based on information in the notification table. In a preferred embodiment, the notification can be done by email, page or by creating a trouble ticket, described below. At this stage the process is complete.

Figure 9:
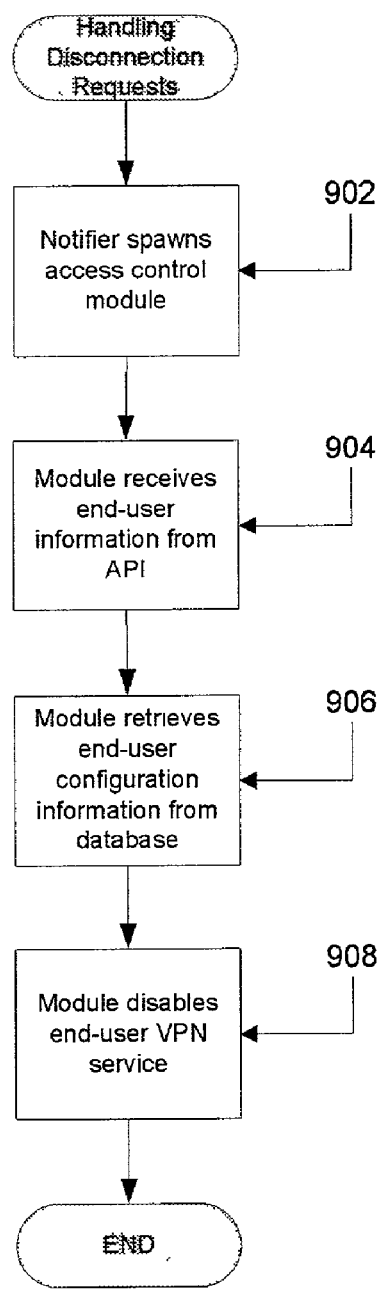
FIG. 9 is a flow diagram of a process in which end-user disconnection requests by the notifier are handled in accordance with one embodiment of the present invention.

FIG. 9 is a flow diagram of a process in which end-user disconnection requests by the notifier are handled in accordance with one embodiment of the present invention. At step 902 an access control module is spawned by the notifier. This is done when the notifier determines that the security violation requires that the end user system be disconnected from the network. When this action should be done is determined by the customer and can vary. In some cases it is done at the first sign of any type of security violation while in other cases it is done as a last resort when a violation is egregious. At step 904 the access control module receives end user information from an application program interface (API) such as information on the security violation, the end user order number, end user name and company name. At step 906 the access control module retrieves end user system configuration information from the database. From this information, the module can determine the type of VPN or network the user is on, the address of the remote user, and a security profile indicator or SPI to access the VPN head-end or other appropriate network component. At step 908 the access control module disables the end user VPN service or disconnects the end user from the company network and the process is complete.

As mentioned above, the notifier can alert a second group of employees or single employee if the first notification of a security violation did not get a response. This is referred to as escalation. For example, when a security violation occurs, a trouble ticket can be created. If the notifier determines that the trouble ticket is unacknowledged after a certain time frame, a second notification group is notified. The same concept applies to email or pages that have not been responded to. If the trouble ticket is acknowledged, the database is updated accordingly by the escalator component of the notifier. If the trouble ticket is not acknowledged within a certain time frame (i.e., a timeout value has been reached), the escalator component escalates the event level in the database and performs the next level of notification.

Event acknowledgements can also be received and recorded by an acknowledger component of the notifier. For responses to email notifications, a system function monitors and captures any replies to email notifications. For example, the subject line or header of an email response is read to determine which report ID or security violation the email is in response to. The acknowledger then retrieves the security violation report from the database and determines whether the report has been previously acknowledged. If it has, the report status is changed to acknowledged. If not, the acknowledger updates the response time to reflect the email notification.

Similarly, a response to a security violation can be through entering an acknowledgement through a website or specific web page. The acknowledger determines the report ID from the website records in the database and accesses the appropriate report ID. If the report has been previously acknowledged, the status of the report and other information are changed to reflect this. If the report has not been acknowledged, the acknowledger either updates the response time to reflect the web notification or it does not alter the record.

Figure 10:
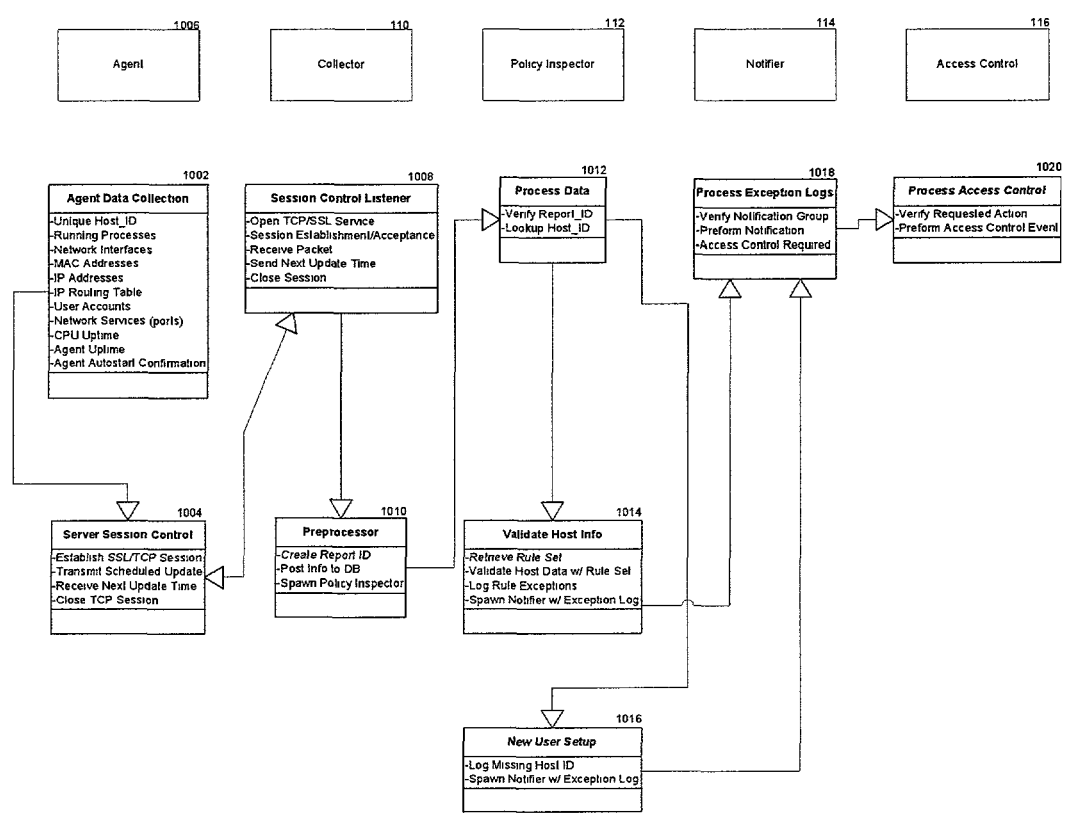
FIG. 10 is a block/flow diagram showing the various functional components of the security monitoring system of the present invention.

FIG. 10 is a block/flow diagram showing the various functional components of the security monitoring system of the present invention. A box 1002 represents data collection and box 1004 is for server session control, both under an agent component 1006. Agent data collector 1006 collects numerous items of data as shown in box 1002. It collects a unique host_id for workstation 102 such as a disk serial number, drive ID and the like, that uniquely identifies the workstation. Also gathered is data about network interfaces, MAC addresses, IP addresses, routing tables, user accounts, network services, such as ports opened, network environment, CPU time, agent uptime and agent confirmation data. This data is collected initially when the workstation is first booted up or turned on and then performed at certain time intervals which may be random or predetermined. If the agent is not invoked on time, the security service provider can detect this by using the CPU uptime and agent uptime data items in box 1002.

Server session control 1004 opens or creates a secure socket layer or SSL/TCP channel over a public network, such as the Internet, between the end user system and server 108 under control of the third-party service provider. Server session control 1004 also packages the data and transmits the data to collector module on server 108. Server session control 1004 receives the next update time, that is, the next time data collection is to take place on workstation 102. This update time is used as a confirmation that the collector received the previous data packets.

Collector 110 has two functional components as shown in FIG. 10: session control listener 1008 and preprocessor 1010. Listener 1008 receives the collected data from the agent and after receiving all the data, listener 1008 closes the SSL/TCP session.

Pre-processor 1010 receives the data from session control listener 1008 and creates a record or report having a unique report_id. The report created has fields or columns closely resembling the data fields gathered by agent data collection module 1002. Preprocessor 1010 posts the report, or record, to data repository 118 and is stored in data collection set area 120 of FIG. 1. This record contains the basic agent monitoring data used to track security policy enforcement. The data can be stored in various formats, for example, a relational database. The preprocessor 1010 signals or spawns the policy inspector.

The policy inspector 112 has three functional components: process data module 1012, validate host data module 1014 and new user setup component 1016. If a host_id is new, control goes to new user setup component 1016 which invokes notifier 114 of FIG. 1 and the validate host data component 1014 examines the host information as contained in the record pulled from the data repository 118. Notifier 114 has a process exception logs component 1018 that verifies notification groups and performs notifications. As described, a particular company can have numerous rule sets for a particular workstation. Validate host data module 1014 retrieves all of them and performs a comparison of each rule set with the data in the record. Access control component 116 can be one "member" in a notification group and is used to typically shutdown or deny access to the workstation. In a preferred embodiment access control 116 has a process access control component 1020 containing logic for verifying a requested action and performing the access control event.

Each rule set has an identifier and belongs to a particular category such as process identifier, network-based, user accounts and so on. A rule is generally divided up into three parts: Allow, Deny and Require. Under Allow are all items or functions that are allowed by the workstation, such as processes A through D and G. The Deny section of a rule set lists all the programs or processes that are to be denied execution on the workstation. The Require section lists all the programs that are required by the security policy for the workstation, such as a firewall program. If a rule set does not match a particular process that is running, an exception is logged. For example, if process A is running but there is no rule set for process A or, more specifically, the Deny section of any rule set includes process A, an exception is logged.

The agent code described can be resident on a firewall or on a workstation. The agent software can function from a firewall that services numerous PCs such as in a home network or on a firewall that services only the workstation. In any scenario, the agent functions in the same manner and contacts the collector of the third-party service provider. The functions of the service provider can be performed at the customer site.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, while a VPN is used to describe a preferred embodiment, the present invention is not restricted to VPNs and can be used with other types of computer networks. Accordingly, the present embodiments are to be considered as illustrative and not restrictive, and the invention is not to be limited to the details given herein, but may be modified within the scope and equivalents of the appended claims.

The invention claimed is:

1. A method for electronically monitoring security enforcement provisions in a computer network, the method comprising:
   receiving, by a security service provider server, a first group of reports including information regarding security violations associated with a network component, wherein the first group of reports was transmitted by a monitoring module of the network component;
   detecting, by the security service provider server, a first group of security policy violations based on the first group of reports, the security policy including security rules identifying security enforcement provisions that must be operational on the network component;
   detecting, by the security service provider server, a second group of security policy violations based on a failure to receive a second group of reports at a scheduled time, wherein the first group of reports was scheduled to be transmitted by the monitoring module of the network component;
   based on the detection of the first and second groups of security policy violations, acting on the network component in a manner in which the computer network operates at a level appropriate to the degree of the first or second group of security violations
   determining a reason for a reset of the monitoring module; and
   determining, based on the reason, that the security policy has been one of violated, modified, or circumvented.

2. The method of claim 1 further comprising:
   transmitting a notification to an operator of the computer network, the notification indicating the detection of the first or second groups of security policy violations.

3. The method of claim 2, wherein the operator is a system administrator of the computer network.

4. The method of claim 1, including storing network component information within the monitoring module.

5. The method of claim 1 further comprising: determining, based on the first group of reports, that the network component has been operational over a specified duration.

6. The method of claim 1 further comprising determining, based on the first group of reports, the monitoring module has not been running continuously since a most recent boot up of the network component.

7. The method of claim 1, wherein the acting on the network component comprises at least one of disconnecting the network component from the computer network, disabling a user virtual private network (VPN) service of the network component, shutting down the network component, and denying an access of the network component to the computer network.

8. The method of claim 1 further comprising: transmitting, by the security service provider server, the scheduled time.

9. The method of claim 1 wherein the receiving of the first group of reports is done over a connection created by the network component.

10. A system comprising:
   a security service provider server computer coupled to a computer network, the security service provider server computer being configured to
   detect security policy violations associated with a network component, the detection based on receipt of a first group of reports and failure to receive a second group of reports at designated times, the security policy including a security rule indicating a group of security provisions that must be operational for the network component;
   determine a reason for a reset of the monitoring module; and
   evaluate whether the reason indicates that the monitoring module has been one of violated, modified, or circumvented; and
   a monitoring module connected to the computer network, the monitoring module configured to transmit the first and second groups of reports at the designated times to the security service provider server computer, the reports including information regarding the network component operation, an access control module included in the security service provider server computer configured to act, based on the detection, on the network component in a manner in which the computer network operates at a level appropriate to the degree of the violation, modification, or circumvention of the monitoring module.

11. The system of claim 10, wherein the security service provider server computer includes a notifier module configured to provide, based on the detection of the first and second groups of security policy violations, a notification of the detection to an operator of the computer network.

12. The system of claim 10, wherein the security service provider server computer is to determine whether one or more of the second group of reports are one of absent, late, or not transmitted at a prescheduled time.

13. The system of claim 10, wherein the security service provider server computer is further configured to determine whether the monitoring module has not been running continuously since a most recent boot up of the network component.

14. The system of claim 10, wherein the security service provider server computer is further configured to determine whether the reason for the reset is one of a termination and a reset by a user of the network component.

15. The system of claim 10, wherein the access control module is to disconnect the network component from the computer network, to disable a user virtual private network (VPN) service of the network component, to shut down the network component, and to deny an access of the network component to the computer network.

16. A system comprising:
a security service provider server computer coupled to a computer network, and including a detecting means and an acting means:
the detecting means for detecting violations within a monitoring module running on a network component included in the network, the monitoring module being utilized to transmit a report to the security service provider server computer, the report including information regarding operation of the network component, the detecting means further for detecting security policy violations based on the report and on absence of the report, the security policy including a security rule identifying security provisions that must be operational for the network component, the detecting means further for determining a reason for a reset of the monitoring module, the detecting means further for determining, based on the reason, that the security policy has been one of violated, modified, or circumvented; and the acting means for selectively acting on the network component, based on the detection, in a manner in which the network operates at a level appropriate to the degree of the violation of the monitoring module.

17. A machine-readable device comprising instructions executable by a machine, the instructions comprising:
instructions for receiving reports from an enforcement provision monitoring module residing in a network component to a security service provider server, wherein the reports include information about security provisions associated with the network component, and wherein the network component and the security service provider server are connected to the computer network;
instructions for detecting that the network component has violated a security policy, wherein the detecting including comparing the information about the network component to rules indicating a group of security provisions which must be operational for the network component;
instructions for determining that the enforcement provision monitoring module failed to transmit other reports at designated times;
instructions for determining, based on the enforcement provision monitoring module's failure to transmit the other reports and based on pings sent to the enforcement provision monitoring module, that the enforcement provision monitoring module is not operational;
instructions for, after the determining that the enforcement provision monitoring module is not operational and failed to transmit the other reports, preventing the network component from performing certain communications over the network;
instructions for transmitting notifications indicating one or more of the enforcement provision monitoring module is not operational and the network component has violated the security policy
instructions for determining a reason for a reset of the monitoring module; and
instructions for evaluating whether the reason indicates that the monitoring module has been one of violated, modified, or circumvented.

18. The machine-readable device of claim 17, wherein the network component is a workstation.

* * * * *